Patented Jan. 16, 1945

2,367,644

UNITED STATES PATENT OFFICE 2,367,644

PROCESS FOR RECOVERY OF RIBOFLAVIN

George E. Hines, Jr., Terre Haute, Ind., assignor to Commercial Solvents Corporation, Terre Haute, Ind., a corporation of Maryland No Drawing. Application May 28, 1943, Serial No. 488,903

14 Claims. (Cl. 260—211)

The present invention relates to a process for recovering dissolved riboflavin from solutions thereof. More particularly, it pertains to a method for the recovery thereof, by chemical precipitation methods.

Riboflavin has been obtained in relatively concentrated solutions from numerous sources, such as liver, yeast, and whey, as well as from certain fermented mashes, such as, for example, the residues obtained from butyl alcohol fermentations. In isolating riboflavin from these sources, it has been customary to filter slurries of these substances in order to obtain a clear solution from which riboflavin can be concentrated, by an adsorbent such as fuller's earth, kaolin, silica gel, etc. The riboflavin thus adsorbed is recovered from the resulting adsorbate by eluting with a suitable eluting agent.

In this connection, various materials have been recommended as eluting agents. Among such materials are aqueous aldehydes and ketones, as well as alcoholic solutions of organic bases. However, such materials have shown numerous disadvantages. For example, pyridine, or methanol solutions thereof, are undesirable from the standpoint of cost and odor. Most of the eluting agents employed also possess the common disadvantage of extracting from the adsorbate relatively large quantities of impurities, as well as the riboflavin itself. A further disadvantage of such processes is that they are not readily adapted to the large-scale production of riboflavin, which is now being practiced.

In my copending application, U. S. Serial No. 435,418, filed March 19, 1942, a process is disclosed whereby dissolved riboflavin can be recovered from nutrient solutions in the form of a precipitate which contains between about 60 and 90 per cent of a riboflavin precursor, by inoculating said solutions with an active culture of bacteria capable of producing a measured potential therein favorable to the procurement of conditions that cause the dissolved riboflavin to be converted into its less soluble precursor. While highly satisfactory results can be secured by utilizing the above-mentioned process, it is not completely free from certain disadvantages. First of all, as indicated above, the application of the aforesaid process is restricted to the recovery of riboflavin from nutrient solutions, i. e., solutions capable of maintaining active growth of the bacteria utilized. A further disadvantage of the above-mentioned procedure is the fact that it must be carried out under reasonably aseptic conditions in order to obtain consistently good results, which obviously require the exercise of considerable care in effecting such operations.

I have now discovered that dissolved riboflavin can be effectively recovered from large volumes of solutions of the type commonly encountered in the commercial production of that vitamin, by the addition of certain types of soluble reducing agents to such solutions. By the use of such reducing agents the dissolved riboflavin is converted into a less soluble form that precipitates, and for convenience will be hereinafter referred to as a "riboflavin precursor."

In carrying out the process of my invention, the solution containing the riboflavin is filtered, if necessary, prior to any other preliminary treatment. Thereafter, the solution is adjusted to a pH of between about 2.0 and 7.5, preferably between 5.0 and 5.5, after which a soluble reducing agent having an $E°$ less negative than about $-0.15$ volt is added thereto at a temperature of between approximately 4° to 45° C., preferably from 20° to 30° C., in an amount sufficient to produce an $E_h$ of between about $+0.050$ and $-0.400$ volt, during the subsequent precipitation and sedimentation steps. Almost immediately thereafter, the precursor will be observed to precipitate. The precipitated mass thus obtained, however, is difficult to filter satisfactorily. Therefore, because of this fact, it is preferable to let the mixture stand until the precipitate has substantially completely settled to the bottom. When this is accomplished, the supernatant liquid is decanted, and the residue filtered, usually in the presence of a suitable filter aid, such as, for example, Filter-Cel which is a finely-divided diatomaceous earth having an average particle size of from about 1 to 12µ.

Riboflavin may be recovered from the resultant residue and purified, in accordance with any of several procedures. I prefer, however, to accomplish such object by the method described in copending application U. S. Serial No. 435,481, filed March 23, 1942, by J. K. Dale. According to that procedure, the aforesaid residue is extracted with a suitable solvent for the riboflavin precursor. This extraction step is generally carried out for a period of from five to ten minutes, or longer, in the presence of agitation, and at a temperature of between about 60° and 90° C. After this treatment the insoluble materials are removed by filtration, and the filtrate rapidly chilled to a temperature of between 15° and 25° C., while air is simultaneously introduced into the chilled solution. As a result of this operation, the precursor is converted into bright yellow crystals of riboflavin which may be readily separated from the mother liquor by filtration, or any other convenient means.

In order to obtain consistently good results, it is generally desirable to employ the solvent for the extraction step in an amount corresponding to not in substantial excess of 1/20 of the volume of the original solution. Within the above-stated limits, however, it will be apparent that the quantity of solvent utilized in any given instant will, in part at least, be dictated by the percentage of riboflavin precursor in the residue obtained by filtration. Ordinarily it will be found that such residue contains from about 60 to 80 per cent precursor. Numerous materials will serve satisfactorily as extractants in my process. Examples of such substances are water, aqueous solutions of lower aliphatic alcohol, propylene glycol, carbitol, methyl carbitol, and the like.

The successful operation of my process is largely dependent upon the maintenance of proper reducing conditions in the solution from which it is desired to precipitate the riboflavin precursor. In this connection, I have found that for best results the measured potential of said solution should lie between about −0.200 and −0.650 volt. Potentials substantially more negative than the latter figure tend to cause decomposition of the aforesaid precursor, and hence should be avoided. The above-mentioned values were determined at 22° C. by measuring the potential of a cell consisting of a gold-plated platinum electrode and a saturated calomel electrode, both of which were in contact with the riboflavin-containing solution. The period of time within which the above-stated potential range is reached, will, in general, depend on the strength and quantity of the particular reducing agent employed, and also the pH and temperature of the solution. Ordinarily, the desired potential is obtained within a few minutes after addition of the reducing agent. Such potential represents the measured potential of the system, or expressed otherwise, the potential of the cell chain. However, the potential of fundamental importance in my process is that which results from the potential difference across the interface existing between the gold-plated platinum electrode and the cell solution, which in the present invention is a riboflavin-containing solution. This potential is represented by the symbol "$E_h$," the relationship of such factor to the measured potential of the cell chain being expressed by the equation:

$$E_h = E_c + E_r$$

where $E_c$ represents the measured potential of the cell chain, and $E_r$ is the potential of the reference electrode, which in the present case is a saturated calomel half-cell. The value for $E_r$ at 22° C., the temperature at which the potentials were measured, is +0.250 volt.

The quantity of reducing agents employed in carrying out my invention, varies within a relatively wide range, and will be found to depend upon several factors, one of which is the measured potential of the riboflavin solution. For example, if the potential of the original solution is comparatively high, there will obviously be required a higher proportion of reducing agent to bring the $E_h$ down to a value that lies within the critical range of about +0.050 and −0.400 volt. However, when the initial potential of the solution is relatively low, of course, a smaller amount of reducing agent will be needed to obtain the potential that falls within the aforesaid range. When the solution has been allowed to come in contact with the atmosphere for an undue length of time, the reducing conditions are disturbed and frequently the $E_h$ is changed to a value that falls outside of the aforesaid range causing the precipitate to go back into solution. To avoid such undesirable conditions it will be frequently found necessary to make periodic additions of reducing agent to the solution.

Generally, it will be observed that the reducing agent can be employed in amounts varying from 2 to 5 moles per mole of dissolved riboflavin. Ordinarily no benefit will be derived by using an excess of reducing agent greater than a mole ratio of 5 to 1, and such may actually prove harmful since the conditions resulting from higher concentrations of reducing agent may promote decomposition of the riboflavin precursor. Also, in this connection, it may be said that solutions containing dissolved riboflavin in concentrations below about 20 μg. per ml. are, for all practical purposes, inoperative in my process. It will, of course, be obvious that riboflavin may be recovered, in accordance with my invention, from solutions containing less than 20 μg. per ml., provided that prior to the use of a reducing agent, the riboflavin content of said solution is increased to the aforesaid value by evaporation, or any other convenient means.

While optimum results are, in general, obtained at temperatures of between about 20° and 30° C. and within a pH range of about 5.0 to 5.5, as previously indicated precipitation will occur at temperatures ranging from about 4° to 45° C. and at pH values of from about 2.0 to 7.5. In this connection, I have observed that at the lower pH values a less negative $E_h$ is required to effect precipitation at a given temperature, but at any fixed pH, the $E_h$ necessary for precipitation will be found to become more negative with increasing temperatures. Furthermore, at any given temperature, the $E_h$ required to effect precipitation becomes more negative with increasing pH of the solution. Otherwise stated, the $E_h$ necessary to bring about precipitation of the riboflavin precursor varies inversely with the increment of the pH and temperature of the solution utilized.

Materials capable of functioning as reducing agents in my process are any of those substances soluble in the riboflavin solution, and having an $E°$ less negative than about −0.15 volt as measured at unit activity at 25° C. Such materials are capable of producing an $E_h$ in solutions of the type contemplated, of between about +0.050 and −0.400 volt. Specific examples of reducing agents capable of producing a potential within the desired range are compounds that furnish the following ions: $S_2O_4^=$, $Sn^{++}$, $Ti^{+++}$, $Cr^{++}$, and $V^{++}$. Compounds which furnish such ions and which are soluble in riboflavin solutions of the type contemplated by my invention, are titanium trichloride, stannous chloride, sodium dithionite $$(Na_2S_2O_4.2H_2O)$$

hypovanadous sulfate, hypovanadous chloride, chromous chloride, chromous sulfate, stannous chloride, and the like.

In the examples which follow, the yields are based upon the value obtained by dividing the weight of riboflavin initially present into the quantity isolated in the form of crystals, plus the riboflavin remaining in the mother liquor. The conversion figures were calculated by dividing the weight of crystals isolated, by the riboflavin initially present.

*Example I*

To 34.5 liters of a solution having a pH of 5.1 and containing riboflavin in a concentration of 310 μg. per ml., was added, at a temperature of 25° C., 25.5 grams of sodium dithionite. The resulting mixture contained particles of riboflavin precursor. However, the precipitate thus formed could not be separated by filtration and, as a result, the mixture was allowed to stand for 22 hours, in order to permit substantially complete sedimentation of the precursor, during which time the $E_h$ of the solution remained substantially constant at —0.299 volt. At the conclusion of this period, the mother liquor was decanted, Filter-Cel added to the residue and the latter filtered through a Buchner funnel. The residue thus obtained was then extracted with 2 liters of 75 per cent isopropyl alcohol, at a temperature of 80° C. The insoluble impurities were then removed by filtration, and the filtrate rapidly chilled to a temperature of about 20° C., during which time air was introduced at the bottom of the containing vessel. As a result of this treatment, bright yellow crystals of riboflavin were obtained as a precipitate. These crystals were isolated from the mother liquor by filtration, and, when dry, amounted to 8 grams. The mother liquor, on assay, showed 1.67 grams of riboflavin, indicating a yield of 90.5 per cent and a conversion of 74.5 per cent.

*Example II*

One thousand five hundred and sixty grams of stannous chloride was added, at a temperature of 20° C. to 370 gallons of a solution having a pH of 5.1 and containing riboflavin in a concentration of 311 μg. per ml. The resulting mixture was then permitted to stand for a period of 18 hours in order to allow for complete sedimentation of the riboflavin precursor, the $E_h$ of the solution during this time being about —0.290 volt. At the conclusion of this period, the mother liquor was decanted and the residue filtered through a 12-inch 12-plate Sperry filter-press. The filter cake thus obtained was next extracted with 19 gallons of 75 per cent isopropyl alcohol, and the dissolved riboflavin crystallized therefrom in accordance with the procedure of Example I. A total of 227 grams of crystalline riboflavin was thus obtained, while the mother liquor from the crystallization step was found to contain 159 grams, corresponding to a conversion of 43.5 per cent, and a yield of 74 per cent.

*Example III*

A solution containing riboflavin in a concentration of 247 μg. per ml., and having a pH of 5.3, was treated with an aqueous solution of chromous sulfate at a temperature of 25° C., the chromous sulfate being employed in a ratio of 5 moles for each mole of riboflavin present. After the addition of the chromous sulfate solution, the resulting mixture was allowed to stand for a period of 1 hour. At the conclusion of this time, the supernatant liquid was decanted, and the residue filtered. The spent top liquor, on assay, showed riboflavin to be present in a concentration of 30 μg. per ml., indicating a recovery of riboflavin from the original solution in an amount corresponding to a yield of 87.9 per cent.

*Example IV*

To a solution having a pH of 5.2 and containing riboflavin in a concentration of 1500 μg. per ml., was added, at a temperature of 28° C., an aqueous solution of hypovanadous sulfate in a ratio of 5 moles of the latter to 1 mole of riboflavin. The resulting mixture was allowed to stand for 1 hour, after which the mother liquor was decanted, and the residue filtered. The decanted mother liquor was found to contain riboflavin in a concentration of 350 μg. per ml., indicating a yield of 70 per cent by difference.

*Example V*

Seven and two-tenths grams of titanium trichloride was added to 14.5 liters of a solution having a pH of 5.2 and containing riboflavin in a concentration of 240 μg. per ml. The resulting mixture was allowed to stand for a period of 17½ hours at a temperature of 28° C. At the conclusion of this period, the supernatant liquid was decanted, and the semi-solid residue filtered. The decanted liquor, on assay, showed riboflavin to be present in a concentration of 36 μg. per ml., indicating a recovery yield of 85 per cent. The residue, obtained by filtration, was extracted with 725 ml. of 75 per cent isopropylalcohol, at 80.° C., in accordance with the method described in Example I. The riboflavin thus recovered, in the form of crystals, amounted to 2.4 grams, corresponding to a conversion of 69 per cent.

It will be apparent that I have made a distinct and basic discovery in the art of recovering riboflavin in crystalline form from its solutions, since the isolation of that vitamin from solutions thereof, by chemical precipitation methods, was, prior to the present invention, unknown. In view, therefore, of the basic character of my invention, it is considered that any method involving the recovery of crystalline riboflavin from its solutions, based upon the use of a soluble reducing agent capable of producing an $E_h$ in such solution of between about +0.050 and —0.400 volt, lies within the scope thereof.

Now having described my invention, what I claim is:

1. In a process for the recovery of riboflavin from solutions having a riboflavin concentration of at least 20 μg. per ml., the steps which comprise adding to the solution a soluble reducing agent having an E° which is less negative than about —0.15 volt, to produce an $E_h$ in said solution corresponding to a value of between about +0.050 and —0.400 volt, filtering the resultant mixture, and isolating the crystalline riboflavin from the residue.

2. In a process for the recovery of riboflavin from solutions having a riboflavin concentration of at least 20 μg. per ml., the step which comprises adding thereto a soluble reducing agent having an E° which is less negative than about —0.15 volt, to produce an $E_h$ in said solution corresponding to a value of between about +0.050 and —0.400 volt, said reducing agent being employed in a ratio of from about 2 to 5 moles per mole of riboflavin present.

3. In a process for the recovery of riboflavin from solutions having a riboflavin concentration of at least 20 μg. per ml., the steps which comprise adjusting the initial pH of the solution to a value ranging from about 2.0 to 7.5, and adding to the solution a soluble reducing agent having an E° which is less negative than about —0.15 volt, to produce an $E_h$ in said solution corresponding to a value of between about +0.050 and —0.400 volt, and precipitating said riboflavin in the form of a precursor, the $E_h$ required to effect said precipitation varying inversely with the increment of the pH.

4. In a process for the recovery of riboflavin from solutions having a riboflavin concentration of at least 20 μg. per ml., the steps which comprise adjusting the initial pH of the solution to a value ranging from about 2.0 to 7.5, and adding to the solution at a temperature of about 4° to 45° C., a soluble reducing agent having an E° which is less negative than about —0.15 volt, to produce an $E_h$ in said solution corresponding to a value of between about $+0.050$ and $-0.400$ volt, and precipitating said riboflavin in the form of a precursor, the $E_h$ required to effect said precipitation varying inversely with the increment of the pH and temperature.

5. In a process for the recovery of riboflavin from solutions having a riboflavin concentration of at least 20 μg. per ml., the steps which comprise adjusting the initial pH of the solution to a value ranging from about 5.0 to 5.5, and adding to the solution at a temperature of about 20° to 30° C., a soluble reducing agent having an E° which is less negative than about $-0.15$ volt, to produce an $E_h$ in said solution corresponding to a value of between about $+0.050$ and $-0.400$ volt, and precipitating said riboflavin in the form of a precursor, the $E_h$ required to effect said precipitation varying inversely with the increment of the pH and temperature.

6. In a process for the recovery of riboflavin from solutions having a riboflavin concentration of at least 20 μg. per mil., the step which comprises adding to the solution a soluble reducing agent capable of furnishing ions selected from the class consisting of $S_2O_4^=$, $V^{++}$, $Cr^{++}$, $Ti^{+++}$, and $Sn^{++}$.

7. In a process for the recovery of riboflavin from solutions having a riboflavin concentration of at least 20 μg. per ml., the steps which comprise adjusting the initial pH of the solution to a value ranging from about 2.0 to 7.5, and adding to the solution a soluble reducing agent capable of furnishing ions selected from the class consisting of $S_2O_4^=$, $V^{++}$, $Cr^{++}$, $Ti^{+++}$, and $Sn^{++}$.

8. In a process for the recovery of riboflavin from solutions having a riboflavin concentration of at least 20 μg. per ml., the steps which comprise adjusting the initial pH of the solution to a value ranging from about 2.0 to 7.5, and adding to the solution at a temperature of about 4° to 45° C., a soluble reducing agent capable of furnishing ions selected from the class consisting of $S_2O_4^=$, $Cr^{++}$, $V^{++}$, $Ti^{+++}$, and $Sn^{++}$.

9. In a process for the recovery of riboflavin from solutions having a riboflavin concentration of at least 20 μg. per ml., the steps which comprise adjusting the initial pH of the solution to a value ranging from about 5.0 to 5.5, and adding to the solution at a temperature of about 20° to 30° C., a soluble reducing agent capable of furnishing ions selected from the class consisting of $S_2O_4^=$, $Cr^{++}$, $V^{++}$, $Ti^{+++}$ and $Sn^{++}$.

10. In a process for the recovery of riboflavin from solutions having a riboflavin concentration of at least 20 μg. per ml., the steps which comprise adding to the solution a soluble reducing agent having an E° which is less negative than about $-0.15$ volt to produce a total potential in said solution corresponding to a value of between about $-0.200$ and $-0.650$ volt, filtering the resultant mixture and isolating the crystalline riboflavin from the residue.

11. In a process for the recovery of riboflavin from solutions having a riboflavin concentration of at least 20 μg. per ml., the steps which comprise adding to the solution a soluble reducing agent having an E° which is less negative than about $-0.15$ volt to produce a total potential in said solution corresponding to a value of between about $-0.200$ and $-0.650$ volt, said reducing agent being employed in a ratio of from about 2 to 5 moles per mole of riboflavin present.

12. In a process for the recovery of riboflavin from solutions having a riboflavin concentration of at least 20 μg. per ml., the step which comprises adding sodium dithionite to the solution.

13. In a process for the recovery of riboflavin from solutions having a riboflavin concentration of at least 20 μg. per ml., the step which comprises adding titanium trichloride to the solution.

14. In a process for the recovery of riboflavin from solutions having a riboflavin concentration of at least 20 μg. per ml., the step which comprises adding stannous chloride to the solution.

GEORGE E. HINES, Jr.